United States Patent
Vija et al.

(10) Patent No.: US 11,182,935 B2
(45) Date of Patent: Nov. 23, 2021

(54) EVALUATION OF IMAGE FORMATION SYSTEM COMPONENTS

(71) Applicant: Siemens Medical Solutions USA, Inc., Malvern, PA (US)

(72) Inventors: Alexander Hans Vija, Evanston, IL (US); Francesc dAssis Massanes Basi, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 104 days.

(21) Appl. No.: 16/838,396

(22) Filed: Apr. 2, 2020

(65) Prior Publication Data

US 2021/0312675 A1   Oct. 7, 2021

(51) Int. Cl.
  *G06K 9/00*   (2006.01)
  *G06T 11/00*  (2006.01)
  *G06T 7/00*   (2017.01)

(52) U.S. Cl.
  CPC .......... *G06T 11/008* (2013.01); *G06T 7/0014* (2013.01); *G06T 2207/10108* (2013.01); *G06T 2207/20084* (2013.01); *G06T 2207/30004* (2013.01)

(58) Field of Classification Search
  CPC ............ G06T 11/008; G06T 7/0014; G06T 2207/10108; G06T 2207/20084; G06T 2207/30004
  See application file for complete search history.

(56) References Cited

U.S. PATENT DOCUMENTS

| | | | |
|---|---|---|---|
| 2007/0132874 A1* | 6/2007 | Forman | H04N 5/232133 348/333.02 |
| 2014/0110589 A1* | 4/2014 | Wang | G01T 1/2985 250/362 |
| 2020/0169661 A1* | 5/2020 | Chen | H04N 5/23222 |
| 2021/0103158 A1* | 4/2021 | Vija | A61B 5/055 |

\* cited by examiner

*Primary Examiner* — Atiba O Fitzpatrick (57) ABSTRACT

A system and method include acquisition of a plurality of sets of images which meet acceptance criteria of an imaging task, each set of images acquired using a respective instance of a type of imaging component, acquisition of a test image using a test instance of the type of imaging component, presentation of a plurality of groups of images, each of the groups of images including the test image and a respective one or more images of the plurality of sets of images, reception, for each group of images, of an indication from an observer of a ranking of the test image of the group with respect to the respective one or more images of the group, and determination of a quality of the test instance of the type of imaging component based on the indications.

19 Claims, 9 Drawing Sheets

EVALUATION OF IMAGE FORMATION SYSTEM COMPONENTS

BACKGROUND

Modern image formation systems include many components which operate in conjunction with one another to form an image of an object. These components may be tested for suitability prior to use or sale, particularly if the design of the component requires tight physical tolerances. Commonly, surrogate tests are applied to a small sample size of a component and, if the surrogate tests pass, it is assumed that an image formed using the component will be acceptable.

The above assumption is tenuous for several reasons. First, testing a small sample does not ensure that components outside of the sample are acceptable. Moreover, even if a specific component passes the surrogate test, the specific component may include deviations which would lead to undesirable consequences within a complex image formation system. Conventional techniques therefore result in acceptance of components that should be rejected (false negative) and rejection of components that should be accepted (false positive).

Systems are desired to efficiently evaluate whether a particular imaging component will generate suitable images when deployed within an image formation system.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments provide improved testing of an imaging component of an image formation system. Initially, a set of "good" images may be acquired using an image formation system and different instances of the imaging component. Next, a test image is acquired using the image formation system and a test instance of the imaging component. An observer compares the test image against each of the "good" images and chooses one image of each compared image pair as better than the other. The results of the comparisons are then used to determine whether to accept or reject the test component.

According to some embodiments described herein, the imaging component under test is a collimator. As a specific example of the above description, a single-photon emission computed tomography (SPECT) system including a first collimator is used to generate an image of a phantom, and the image is determined to meet acceptance criteria for a generic or a specific imaging task. The process is repeated multiple times using the same SPECT system and phantom but different collimators in order to obtain a set of acceptable collimators and "normal" images generated using those acceptable collimators.

Next, a test collimator is inserted into the same SPECT system which was used to acquire the acceptable images. Embodiments are not limited to use of the same SPECT system during the testing operation. A test image (e.g., of the same phantom) is acquired using the SPECT system including the test collimator. An observer (e.g., human and/or machine) compares the test image individually against each of the images acquired using the acceptable set of collimators and generates a determination indicating which of the two compared images is better. "Better" in this context may refer to suitability for its intended purpose (e.g., coronary scan), to image quality (e.g., less noise), and/or any other characteristic.

The test collimator is determined as acceptable or unacceptable based on the determinations. For example, the test collimator may be determined as acceptable if the test image is determined as better than the acceptable image in over 50% of the comparisons. Although the present example concerns collimators, any other imaging component of an image formation system may be similarly evaluated, such as but not limited to reconstruction methods, scintillators, and gamma cameras.

Some embodiments perform the above-described comparisons using one or more human observers. Embodiments may also or alternatively utilize a neural network trained to perform the comparison based on groups of images. Such embodiments may provide better results than a neural network trained simply to classify a single image as "good" or "bad" due to inherent modeling errors and knowledge gaps in such a trained model.

Figure 1:
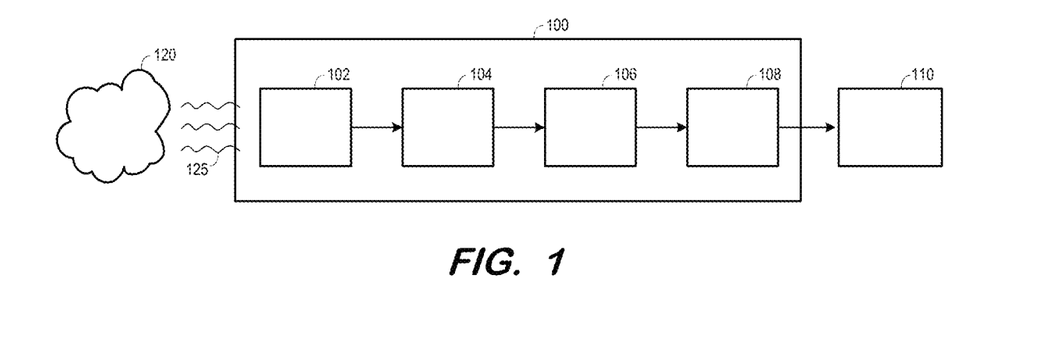
FIG. 1 is a block diagram of an image formation system including a chain of imaging components according to some embodiments.

FIG. 1 illustrates image formation system 100 according to some embodiments. Image formation system 100 may comprise any system capable of forming image 110 based on object 120. Image formation system 100 receives signals 125 (e.g., reflective, emissive, transmissive) representing object 120 and processes the signals 125 via a chain of imaging components 102 through 108. Although the chain is illustrated as linear, components 102 through 108 of image formation system 100 may provide parallel, branched, iterative and/or any other types of processing.

Each of imaging components 102 through 108 may comprise any combination of physical component, computer hardware and computer software. Each of imaging components 102 through 108 may therefore comprise any number of sub-components. The embodiments described herein may be implemented to provide efficient testing any of such components and/or sub-components. Embodiments may be implemented in conjunction with any image formation system, including but not limited to still cameras, ultrasound imaging devices, computed tomography imaging devices, positron emission tomography devices, and magnetic resonance imaging devices.

Figure 2:
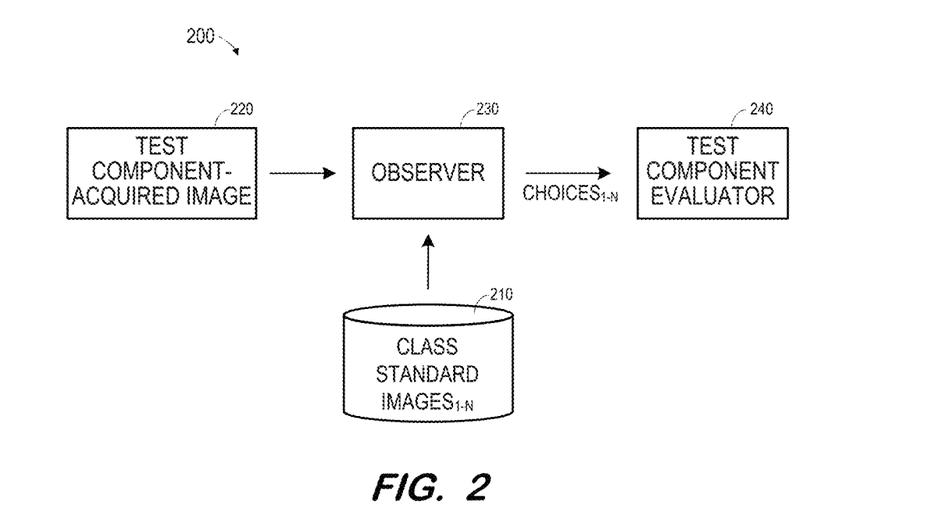
FIG. 2 is a block diagram of a system to evaluate an imaging component according to some embodiments.

FIG. 2 illustrates system 200 according to some embodiments. System 200 may be implemented using any suitable combination of hardware and/or software. Each unit, component or other functional system described herein may be implemented by one or more computing devices (e.g., computer servers), storage devices (e.g., hard or solid-state disk drives), and other hardware as is known in the art. These components may be located remote from one another and may be elements of one or more cloud computing platforms, including but not limited to a Software-as-a-Service, a Platform-as-a-Service, and an Infrastructure-as-a-Service platform.

Class standard images$_{1-N}$ 210 are acquired prior to the operation depicted in FIG. 2. Class standard images$_{1-N}$ 210 may comprise images of a phantom and may be acquired using a same image formation system but with different instances of an imaging component. With respect to system 100, in a case that class standard images$_{1-N}$ 210 are intended to test an instance of imaging component 104, each of class standard images$_{1-N}$ 210 may acquired using a different instance of imaging component 104. In some embodiments, class standard images$_{1-N}$ 210 include for each of several instances of imaging component 104, any number of images. The any number of images per imaging component 104 may depict any number of phantoms.

Image 220 is acquired using the image formation system and a test instance of the subject imaging component. This image acquisition may occur well after generation of class standard images$_{1-N}$ 210. Observer 230 compares image 220 against each of class standard images$_{1-N}$ 210 to generate corresponding choices$_{1-N}$. Test component evaluator 240 then determines whether the test component is acceptable or not based on choices$_{1-N}$. For example, test component evaluator 240 may deem the test component acceptable if a number of choices$_{1-N}$ which indicate image 220 is greater than a threshold percentage of N. According to some embodiments, image 220 may be added to class standard images$_{1-N}$ 210 (perhaps at the expense of one of class standard images$_{1-N}$ 210) if the number of choices$_{1-N}$ which indicate image 220 is greater than a second, higher threshold percentage of N.

Figure 3:
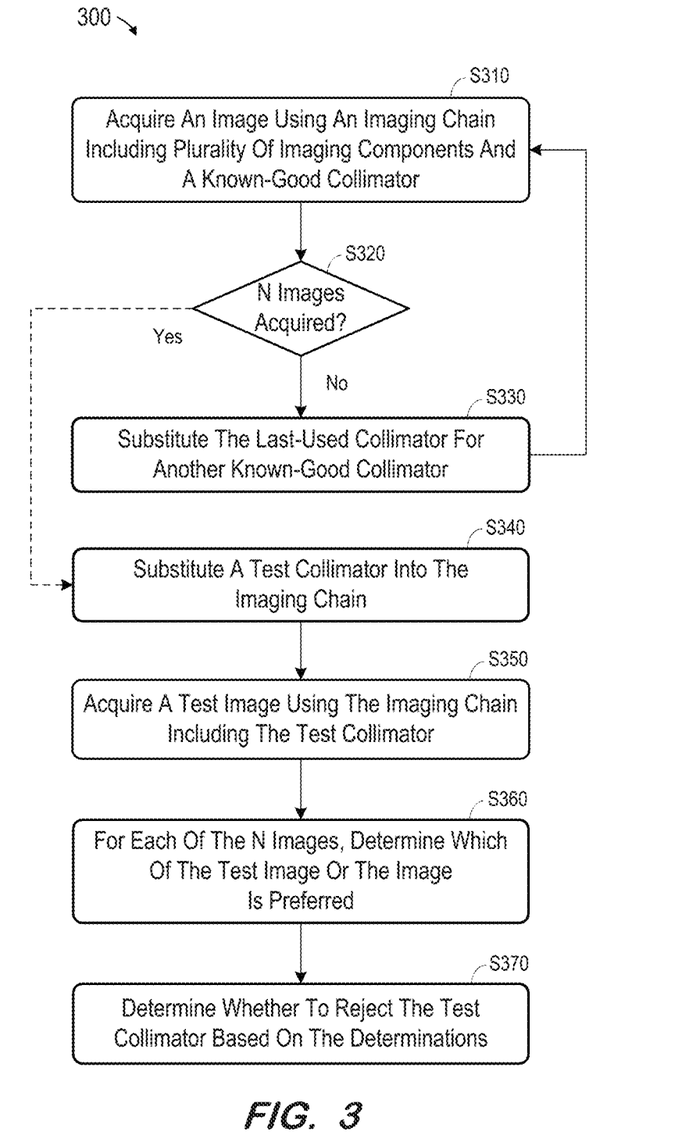
FIG. 3 is a flow diagram of a process to determine a set of class standard images and evaluate an imaging component based thereon according to some embodiments.

FIG. 3 is a flow diagram of a process according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a CD, a DVD, a Flash drive, or a magnetic tape. Embodiments are not limited to the examples described below.

Initially, at S310, an image is acquired using an imaging chain including a plurality of imaging components and a known-good collimator. Embodiments are described herein with respect to a SPECT system imaging chain and a SPECT collimator, but any type of image formation system may be employed in order to test any imaging component of such an image formation system. Moreover, rather than using a collimator which has previously been determined as acceptable to acquire the image at S310, an image may be acquired using a collimator, evaluated for acceptability and, if the image is acceptable, the collimator used to acquire the image is then considered good.

Figure 4:
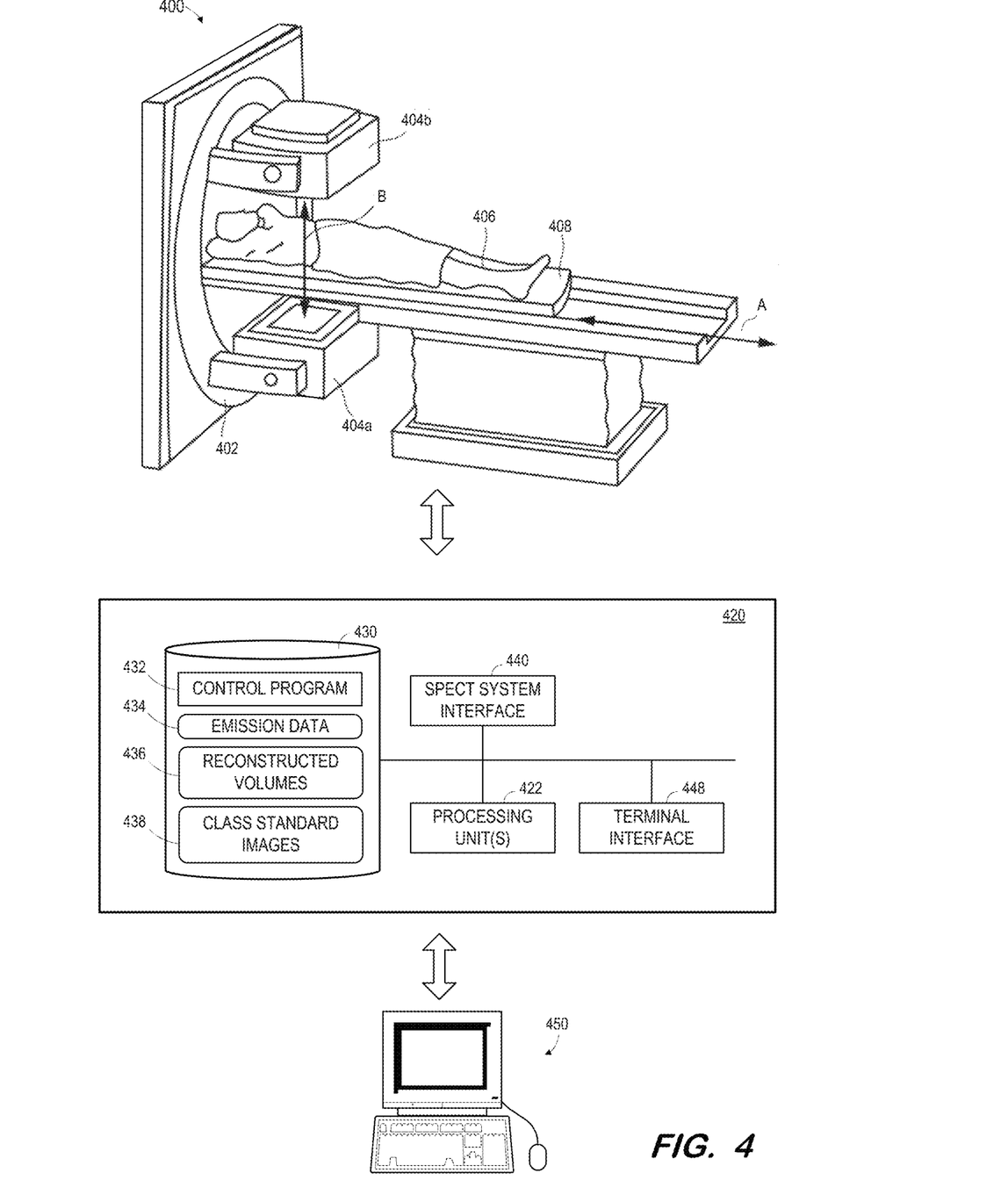
FIG. 4 illustrates a SPECT imaging system according to some embodiments.

FIG. 4 illustrates SPECT system 400 which may implement process 300 as described above. System 400 includes gantry 402 to which two or more gamma cameras 404a, 404b are attached, although any number of gamma cameras can be used. A detector within each gamma camera detects gamma photons (i.e., emission data) emitted by a radioisotope within phantom 406 on bed 408.

Bed 408 is capable of moving phantom 406 along axis A and/or axis B. At respective bed positions (i.e., imaging positions), a portion of phantom 406 is positioned between gamma cameras 404a, 404b in order to capture emission data from that body portion. Gamma cameras 404a, 404b may include multi-focal cone-beam collimators or parallel-hole collimators as is known in the art.

Figure 5:
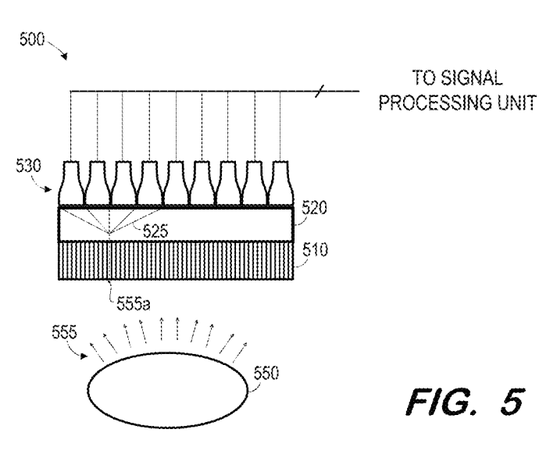
FIG. 5 illustrates components of a SPECT imaging system according to some embodiments.

FIG. 5 illustrates a structure of gamma camera 500 according to some embodiments. Camera 500 includes collimator 510, scintillation crystal 520, and light sensor array 530. Scintillation crystal 520 may comprise a thallium-doped sodium iodide crystal that generates light photons in response to gamma radiation 555 received from object 550 (e.g., a phantom, a patient's body).

Conventionally, a radioactive isotope (not shown) is administered to object 550. The radioactive isotope emits gamma photons while present in object 550, and these gamma photons 555 subsequently exit object 550. Gamma photons 555 are collimated by collimator 510 to define their line-of-response and to filter out scattered or stray gamma radiation, and the thus-collimated photons are received at various locations of scintillation crystal 520. Scintillation crystal 520 converts the gamma radiation (e.g., gamma photon 555a) into light photons (e.g., light photons 525), which may be detected by sensor array 530.

Sensor array 530 may comprise an array of photomultiplier tubes (PMTs). A typical PMT of sensor array 530 may include a semi-transparent photocathode, a focusing grid, dynodes, and an anode (not shown). Sensor array 530 converts light photons emitted by scintillation crystal 520 into electronic signals representing the number of light photons collected. A signal processing unit 1 (not shown) receives the electronic signals from sensor array 530 and processes the electronic signals to generate an image of object 550.

Returning to FIG. 4, control system 420 may comprise any general-purpose or dedicated computing system. Accordingly, control system 420 includes one or more processing units 422 configured to execute processor-executable program code to cause system 420 to operate as described herein, and storage device 430 for storing the program code. Storage device 430 may comprise one or more fixed disks, solid-state random access memory, and/or removable media (e.g., a thumb drive) mounted in a corresponding interface (e.g., a USB port).

Storage device 430 stores program code of system control program 432. One or more processing units 422 may execute system control program 432, in conjunction with SPECT system interface 440, to control motors, servos, and encoders to cause gamma cameras 404a, 404b to rotate along gantry 402 and to acquire two-dimensional emission data (i.e., projection images) at defined imaging positions during the rotation. The acquired data 434 may be stored in memory 430. Control program 432 may also be executed to reconstruct volumes 436 from emission data 434 as is known.

Control program 432 may also be executed to cause control system 420 to perform process 300, including acquisition of class standard images 438, administration of comparisons between a test image and each of class standard images 438, and evaluation of a test component based on the comparisons.

Terminal 450 may comprise a display device and an input device coupled to system 420. Terminal 450 may display any of two-dimensional emission data 434 and reconstructed volumes 436. Terminal 450 may also display a test image alongside a class standard image 438, and receive user input indicating a choice of one displayed image over the other. In some embodiments, terminal 450 is a separate computing device such as, but not limited to, a desktop computer, a laptop computer, a tablet computer, and a smartphone.

Each of component of system 400 may include other elements which are necessary for the operation thereof, as well as additional elements for providing functions other than those described herein.

At S320, it is determined whether a predetermined number N of images has been acquired. N may be determined in view of the type of observer which will be used to compare the images to a test image, and/or in view of the desired accuracy of the test. For example, a human observer may require 15 minutes to perform the comparison (suggesting a smaller N) while a trained network may operate much faster (suggesting a larger N). Moreover, reliability of the evaluation increases as N increases but may level off after a certain number of comparisons (e.g., 12). Additionally, it may be useful in some embodiments to use an odd number N to avoid an evenly-split result of the comparisons.

Assuming N images have not yet been acquired, flow proceeds to S330 to substitute the collimator used to acquire the last image with another collimator. Flow returns to S310 to acquire another image using the substitute collimator, and continues cycling in this manner until N "good" images have been acquired using N collimators. According to some embodiments, more than one image is acquired per collimator at S310. Such images may be of different phantoms, acquired from different angles, or otherwise differ from one another.

Flow proceeds to S340 once the determination at S320 is positive. S340 may occur in a different location and/or days, weeks or months later than S310, S320 and S330. At S340, a test collimator is substituted into the imaging chain used to acquire the N images. A test image (e.g., of the same phantom) is then acquired at S350 using the imaging chain including the test collimator. At S360, an observer (e.g., human and/or machine) compares the acquired test image against each of the N images and generates a determination indicating which of the two compared images is preferred.

Figure 6:
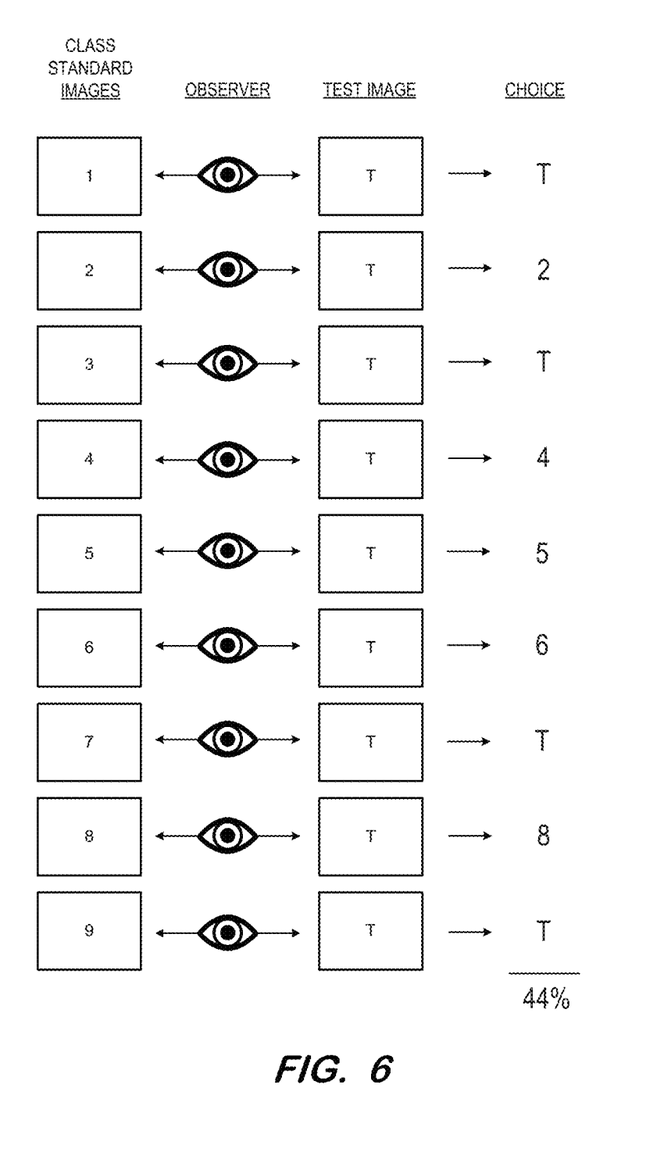
FIG. 6 depicts comparisons between a test image and each image of a set of images according to some embodiments.

FIG. 6 illustrates a comparison at S360 according to some embodiments. FIG. 6 shows class standard images 1-9 to be compared with test image T. According to some embodiments, the comparisons may be presented to the observer any number of times and/or in any suitable order to reduce variability. An observer views test image T and one of the class standard images and indicates a choice between the two images. All nine choices are recorded, and together indicate that test image T was chosen 44% of the time.

Embodiments are not limited to comparison between two images. Each comparison may be based on a group of images, where the group includes the test image and two or more of the class standard images. The comparison may rank the images of the group from best to worst, or may rank one of the images as best and the other images as "not best".

Figure 7:
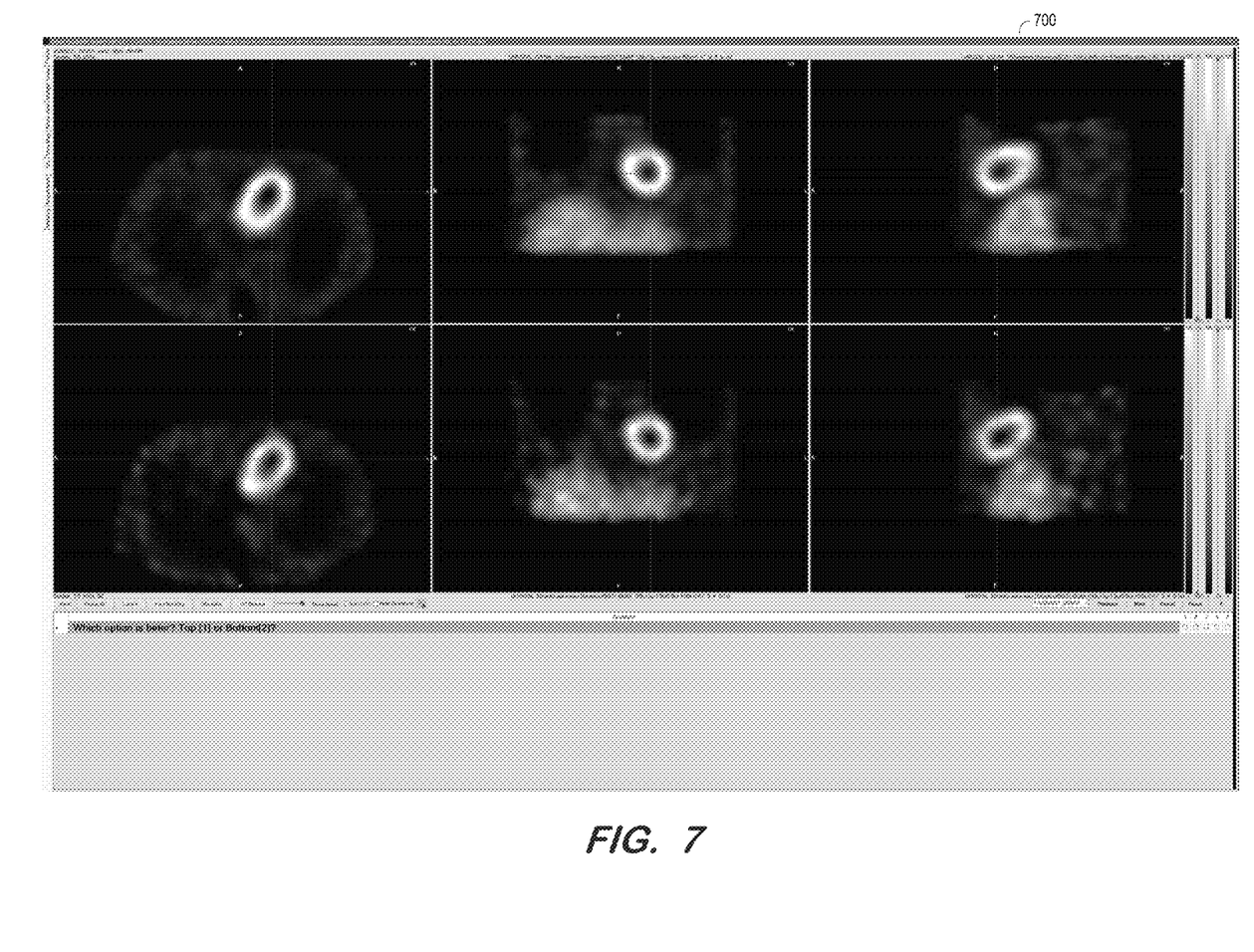
FIG. 7 is a user interface for comparing a test image and each image of a set of images according to some embodiments.

FIG. 7 illustrates user interface 700 presenting a class standard image "Option A" and a test image "Option B". User interface 700 also includes a user interface control which allows the observer to indicate one of the images as being better than the other. Accordingly, the acquired and compared images may comprise three-dimensional reconstructed volumes generated based on multiple projection images as is known in the art. Comparison of two images may therefore comprise viewing and comparing slices of each of such volumes.

The test collimator is rejected or accepted at S370 based on the determinations at S360. In some embodiments, the test collimator is determined to be acceptable if the test image is determined as better than the class standard image in over 50% of the comparisons. Any other algorithm based on the determinations may be used at S370.

As described above, the observer may comprise a trained neural network in some embodiments. A potential advantage of such an arrangement is that comparisons may proceed more quickly than using human observers, enabling more comparisons within a given amount of time.

Figure 8:
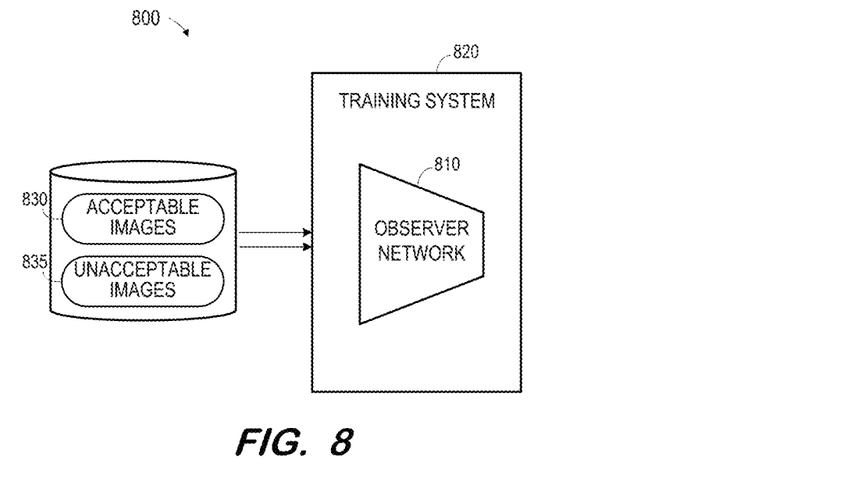
FIG. 8 is a block diagram of a system to train an observer network based on acceptable and unacceptable images according to some embodiments.

FIG. 8 illustrates system 800 to train an observer network according to some embodiments. Network 810 is trained using training system 820 and pre-stored and labeled acceptable images 830 and unacceptable images 835. Observer network 810 receives one of acceptable images 830 and one of unacceptable images 835, and outputs a choice of which image is better. Training system 820 trains observer network 810 to choose correctly based on the known relative quality (i.e., the ground truth) of the input images.

Broadly, observer network 810 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data. Observer network 810 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

Observer network 810 may be trained using training system 820 as is known in the art to generate a function. Training system 820 may comprise any system or systems for training an artificial neural network that are or become known. For example, training system 820 may employ supervised learning and/or reinforcement learning used as a function approximator as is known in the context of deep neural networks. Generative adversarial networks may be used including a generative and a discriminative network as is known.

Figure 9:
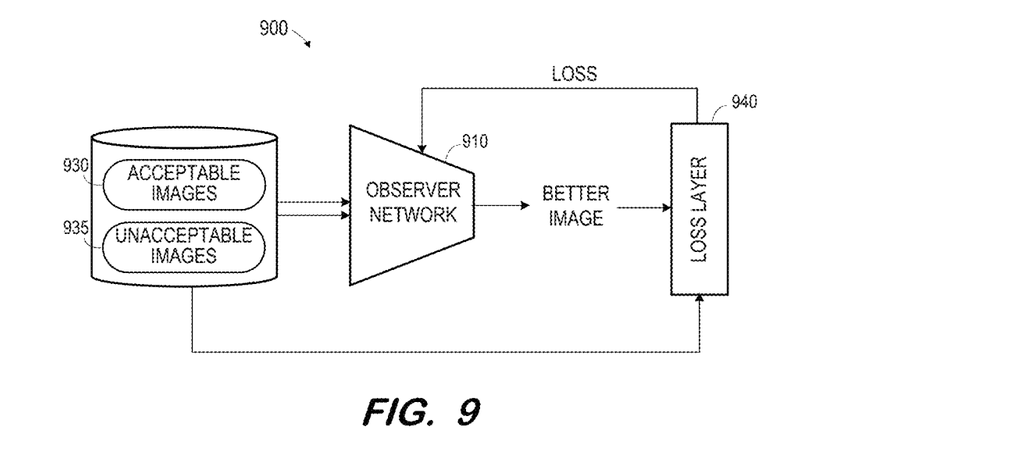
FIG. 9 is a block diagram of a system to train an observer network based on acceptable and unacceptable images according to some embodiments.

FIG. 9 illustrates detailed training architecture 900 to train an observer network according to some embodiments. Embodiments are not limited to the type of training depicted in FIG. 9.

During training, network 910 receives one of acceptable images 930 and one of unacceptable images 935. Based on its initial configuration and design, network 910 outputs a predicted indication of the better image based on each received image. Loss layer component 940 determines a loss by comparing each predicted indication to the actual answer regarding which was the better of the two input images which generated the prediction. The foregoing is performed for many pairs of acceptable images 930 and unacceptable images 935 to determine a total loss. The loss may comprise an L1 loss, and L2 loss, or any other suitable measure of total loss.

The total loss is back-propagated from loss layer component 940 to network 910, which changes its internal weights in response as is known in the art. The process repeats until it is determined that the total loss has reached an acceptable level or training otherwise terminates.

According to some embodiments, the trained neural network implements a function. The function may be characterized as a set of parameter values associated with each network node. In one example, the function is represented by parameter values for kernels of a fully convolutional network. The function (e.g., embodied in parameter values of trained convolutional kernels) may be deployed after as is known in the art to an external system such as system 1000 of FIG. 10. The computing system in which the trained network is deployed may be different from the computing system used to train the network. Observer network 1010 of system 1000 may comprise any type of computing system to implement the learned functions resulting from the training of a neural network.

Figure 10:
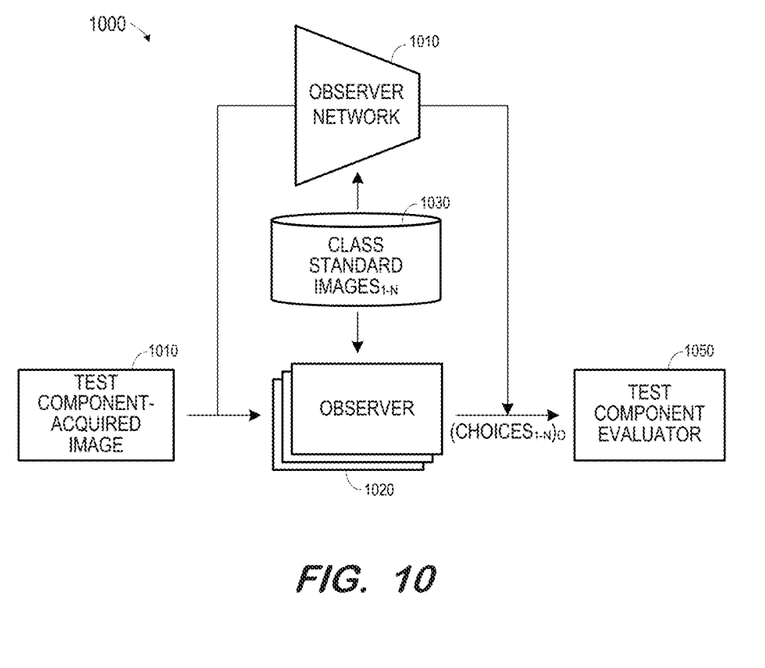
FIG. 10 is a block diagram of a system including a trained observer network to evaluate an imaging component according to some embodiments.

System 1000 may operate as described above with respect to system 200 and/or process 300. System 1000 includes multiple human observers 1020 and trained observer network 1010. For each image pair consisting of test component-acquired image 1010 and one of class standard images$_{1-N}$ 1030, each observer 1020 and observer network 1010 generates a choice as to the better image of the pair. Accordingly, if each class-standard image$_{1-N}$ 1030 is evaluated once, test component evaluator 1050 receives N×(# of observers) choices. Test component evaluator 1050 may evaluate the multiple choices per image pair in any suitable manner, including based on majority decision, based on weights associated with each observer, etc.

Figure 11:
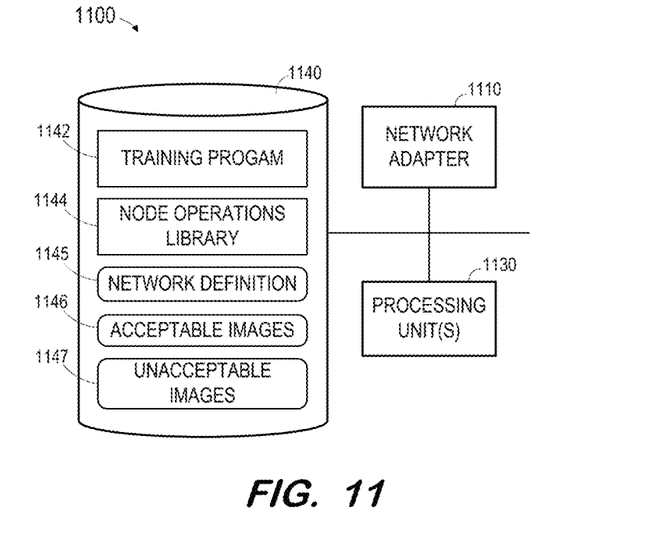
FIG. 11 is a block diagram of a computing system to train a network to compare images according to some embodiments.

FIG. 11 illustrates computing system 1100 according to some embodiments. System 1100 may comprise a computing system to facilitate the design and training of a network as is known in the art. Computing system 1100 may comprise a standalone system, or one or more elements of computing system 1100 may be located in the cloud.

System 1100 includes network adapter 1110 to communicate with external devices via a network connection. Processing unit(s) 1130 may comprise one or more processors, processor cores, or other processing units to execute processor-executable process steps. In this regard, storage system 1140, which may comprise one or more memory devices (e.g., a hard disk drive, a solid-state drive), stores processor-executable process steps of training program 1142 which may be executed by processing unit(s) 1130 to train a network as described herein.

Training program 1142 may utilize node operations library 1144, which includes code to execute various operations associated with node operations as defined in node operations library 1144. According to some embodiments, computing system 1100 provides interfaces and development software (not shown) to enable development of training program 1142 and generation of network definition 1145. Storage device 1140 also includes acceptable images 1146 and unacceptable images 1147, which may be used by training program 1142 as described above to train a network defined by network definition 1145.

Figure 12:
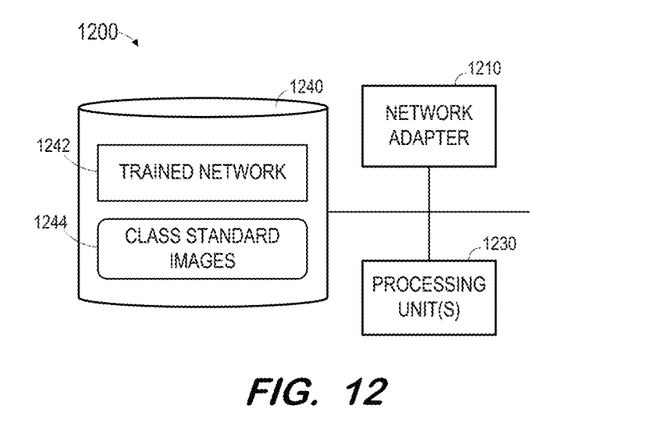
FIG. 12 is a block diagram of a computing system deploying a trained network to compare images according to some embodiments.

FIG. 12 illustrates system 1200 in which a trained network may be deployed according to some embodiments. One or more processing units 1230 may execute processor-executable program code implementing trained network 1242. The code may implement convolution kernels or other data structures exported by system 1100 after training of a network. Trained network 1242 may be executed to receive a test image and one of class standard images 1244, and determine which image is better. Storage device 1240 may comprise one or more fixed disks, solid-state random access memory, and/or removable media (e.g., a thumb drive) mounted in a corresponding interface (e.g., a USB port).

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a storage device;
   a processor to execute processor-executable process steps stored on the storage device to cause the system to:
   acquire a plurality of sets of images which meet acceptance criteria of an imaging task, each set of images acquired using a respective instance of a type of imaging component;
   acquire a test image using a test instance of the type of imaging component;
   present a plurality of groups of images, each of the groups of images including the test image and a respective one or more images of the plurality of sets of images;
   for each group of images, receive an indication from an observer of a ranking of the test image of the group with respect to the respective one or more images of the group; and
   determine a quality of the test instance of the type of imaging component based on the indications.

2. A system according to claim 1,
wherein the type of imaging component is a collimator.

3. A system according to claim 2, wherein the type of imaging component is a SPECT collimator.

4. A system according to claim 1, the processor to execute processor-executable process steps stored on the storage device to cause the system to:
for each group of images, receive a second indication from a second observer of a ranking of the test image of the group with respect to the respective one or more images of the group,
wherein the quality of the test instance of the type of imaging component is determined based on the indications and the second indications.

5. A system according to claim 4, wherein the second observer is a trained neural network.

6. A system according to claim 1, wherein the plurality of sets of images and the test image are acquired using a same imaging system but for the type of imaging component.

7. A system according to claim 1, wherein the observer is a trained neural network.

8. A method comprising:
acquiring a plurality of sets of images which meet acceptance criteria of an imaging task, each set of images acquired using a respective instance of a type of imaging component;
acquiring a test image using a test instance of the type of imaging component;
presenting a plurality of groups of images, each of the groups of images including the test image and a respective one or more images of the plurality of sets of images;
for each group of images, receiving an indication from an observer of a ranking of the test image of the group with respect to the respective one or more images of the group; and
determining a quality of the test instance of the type of imaging component based on the indications.

9. A method according to claim 8,
wherein the type of imaging component is a collimator.

10. A method according to claim 9, wherein the type of imaging component is a SPECT collimator.

11. A method according to claim 8, further comprising:
for each group of images, receive a second indication from a second observer of a ranking of the test image of the group with respect to the respective one or more images of the group,
wherein the quality of the test instance of the type of imaging component is determined based on the indications and the second indications.

12. A method according to claim 11, wherein the second observer is a trained neural network.

13. A method according to claim 8, wherein the plurality of images and the test image are acquired using a same imaging system but for the type of imaging component.

14. A method according to claim 8, wherein the observer is a trained neural network.

15. A system comprising:
an imaging system to acquire a test image using a test collimator; and
a control system to:
present a plurality of groups of images, each of the groups of images including the test image and a respective one or more images of a plurality of sets of images, each of the sets of images acquired using a respective instance of a collimator;
for each group of images, receive an indication from an observer of a ranking of the test image of the group with respect to the respective one or more images of the group; and
determine a quality of the test collimator based on the indications.

16. A system according to claim 15, the control system to:
for each group of images, receive a second indication from a second observer of a ranking of the test image of the group with respect to the respective one or more images of the group,
wherein the quality of the test collimator is determined based on the indications and the second indications.

17. A system according to claim 16, wherein the second observer is a trained neural network.

18. A system according to claim 15, wherein the plurality of sets of images are acquired using the imaging system.

19. A system according to claim 15, wherein the observer is a trained neural network.

* * * * *